United States Patent
Lu et al.

(10) Patent No.: US 8,582,644 B2
(45) Date of Patent: Nov. 12, 2013

(54) REAL-TIME TRANSPORT PROTOCOL (RTP) PACKETIZATION METHOD FOR FAST CHANNEL CHANGE APPLICATIONS USING SCALABLE VIDEO CODING (SVC)

(75) Inventors: Xiuping Lu, Hillsborough, NJ (US); Zhenyu Wu, Plainsboro, NJ (US); John Qiang Li, Belle Mead, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 317 days.

(21) Appl. No.: 12/737,556

(22) PCT Filed: Jan. 29, 2009

(86) PCT No.: PCT/US2009/000574
§ 371 (c)(1),
(2), (4) Date: Jan. 25, 2011

(87) PCT Pub. No.: WO2010/014123
PCT Pub. Date: Feb. 4, 2010

(65) Prior Publication Data
US 2011/0134994 A1 Jun. 9, 2011

Related U.S. Application Data

(60) Provisional application No. 61/083,909, filed on Jul. 26, 2008.

(51) Int. Cl.
*H04B 1/66* (2006.01)
*H04N 7/26* (2006.01)
(52) U.S. Cl.
USPC .................................. 375/240.02; 375/240.26
(58) Field of Classification Search
USPC ........................................ 375/240.01–240.28
See application file for complete search history.

(56) References Cited

U.S. PATENT DOCUMENTS

| | | | |
|---|---|---|---|
| 2006/0078047 A1* | 4/2006 | Shu et al. | 375/240.01 |
| 2008/0018803 A1 | 1/2008 | Tourapis et al. | |
| 2010/0232508 A1* | 9/2010 | Kang et al. | 375/240.16 |
| 2010/0232520 A1* | 9/2010 | Wu et al. | 375/240.26 |
| 2011/0110418 A1* | 5/2011 | Lu et al. | 375/240.02 |

FOREIGN PATENT DOCUMENTS

| | | |
|---|---|---|
| CN | 1973550 | 5/2007 |
| EP | 1713280 | 10/2006 |

OTHER PUBLICATIONS

Wenger et al:"RTP Payload Format for SVC Video Draft-ietf-avt-rtpsvc-13.txt," Internet, Online, Jul. 14, 2008, pp. 1-86.

(Continued)

*Primary Examiner* — Behrooz Senfi
(74) *Attorney, Agent, or Firm* — Robert D. Shedd; Joseph J. Opalach

(57) ABSTRACT

An apparatus encodes a video signal for providing a scalable video coded (SVC) signal comprising a base layer video coded signal and an enhancement layer video coded signal, wherein the base layer video coded signal has more random access points, e.g., Instantaneous Decoder Refresh (IDR) slices, than the enhancement layer and in those access units where the enhancement layer has an IDR slice, the base layer has a non-IDR slice. Transmission of the SVC occurs in packet form using the Real-time Transport Protocol (RTP) such that non-random access point slices are conveyed in Simple Time Aggregation Packets (STAP), each Simple Time Aggregation Packet comprising a Payload Content Scalability Information (PACSI) Network Abstraction Layer (NAL) Unit.

14 Claims, 12 Drawing Sheets

(56) References Cited

OTHER PUBLICATIONS

Wang et al.:"System and Transport Interface of SVC," IEEE Transactions on Circuit Systems for video Technology, vol. 17, No. 9, Sep. 2007, pp. 1149-1163.

Boyce et al.:"Fast Efficient Channel Change," Thomson Corporate Research, 1.1-1, IEEE, 2005, pp. 1-2.

Wang et al.:"Enhancement-Layer IDR (EIDR) Picture," Joint Video Team of ISO/IEC MPEG & ITU0T VCEG, Doc. JVT-P065, Oct. 14, 2005, pp. 1-7.

* cited by examiner

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|NRI|  Type   |R|I|   PRID    |N| DID | | QID | |TID|U|D|O|RR|
+-+-+-+-+-+-+-+-+-+-+-+-+-+-+-+-+-+-+-+-+-+-+-+-+-+-+-+-+-+-+-+-+
|X|Y|T|A|P|C|S|E| TL0PICIDX (o.)|       IDRPICID (o.)           |
+-+-+-+-+-+-+-+-+-+-+-+-+-+-+-+-+-+-+-+-+-+-+-+-+-+-+-+-+-+-+-+-+
|          DONC (o.)            |                               |
+-+-+-+-+-+-+-+-+-+-+-+-+-+-+-+-+                               |
|                         NAL unit 1 size                       |
+-+-+-+-+-+-+-+-+-+-+-+-+-+-+-+-+-+-+-+-+-+-+-+-+-+-+-+-+-+-+-+-+
|                                                               |
|                         NAL unit 1                            |
|                                                               |
+-+-+-+-+-+-+-+-+-+-+-+-+-+-+-+-+-+-+-+-+-+-+-+-+-+-+-+-+-+-+-+-+
|                         NAL unit 2 size                       |
+-+-+-+-+-+-+-+-+-+-+-+-+-+-+-+-+-+-+-+-+-+-+-+-+-+-+-+-+-+-+-+-+
|                                                               |
|                         NAL unit 2                            |
|                                                               |
+-+-+-+-+-+-+-+-+-+-+-+-+-+-+-+-+-+-+-+-+-+-+-+-+-+-+-+-+-+-+-+-+
|                         SEI NAL unit 2                        |
+-+-+-+-+-+-+-+-+-+-+-+-+-+-+-+-+-+-+-+-+-+-+-+-+-+-+-+-+-+-+-+-+
```

498
499

REAL-TIME TRANSPORT PROTOCOL (RTP) PACKETIZATION METHOD FOR FAST CHANNEL CHANGE APPLICATIONS USING SCALABLE VIDEO CODING (SVC)

This application claims the benefit, under 35 U.S.C. §365 of International Application PCT/US2009/000,574, filed 29 Jan. 2009, which was published in accordance with PCT Article 21(2) on 4 Feb. 2010 in English and which claims the benefit of United States Provisional Patent Application No. 61/083,909 filed 26 Jul. 2008.

CROSS-REFERENCE TO RELATED APPLICATIONS

This application claims the benefit of U.S. Provisional Application No. 61/081,056, filed Jul. 16, 2008 and U.S. Provisional Application No. 61/083,909, filed Jul. 26, 2008.

BACKGROUND OF THE INVENTION

The present invention generally relates to communications systems, e.g., wired and wireless systems such as terrestrial broadcast, cellular, Wireless-Fidelity (Wi-Fi), satellite, etc.

When a compressed video bit stream is delivered through an error-prone communication channel, such as a wireless network, certain parts of the bit stream may be corrupted or lost. When such erroneous bit streams reach the receiver and are decoded by a video decoder, the playback quality can be severely impacted. Source error resiliency coding is a technique used to address the problem.

In a video broadcast/multicast system, one compressed video bit stream is usually delivered to a group of users simultaneously in a designated time period often called a session. Due to the predictive nature of video coding, random access to a bit stream is only available at certain random access points inside the bit stream, so that correct decoding is only possible starting from these random access points. Since random access points generally have lower compression efficiency, there are only a limited number of such points within a bit stream. As a result, when a user tunes his receiver to a channel and joins in a session, he has to wait for the next available random access point in the received bit stream in order to have correct decoding started, which causes a delay in playback of video content. Such a delay is called tune-in delay, and it is an important factor that affects user experience of the system.

In a video delivery system, several compressed video bit streams are often delivered to the end users sharing a common transmission medium, where each video bit stream corresponds to a program channel. Similar to the previous case, when a user switches from one channel to another, he has to wait for the next available random access point in the received bit stream from the channel, in order to start decoding correctly. Such a delay is called channel-change delay, and is another important factor affecting user experience in such systems.

An advantage of inserted random access points is to improve error resiliency of a compressed video bit stream from a video coding point of view. For example, a random access point that is inserted into a bit stream periodically resets the decoder and completely stop error propagation, which improves the robustness of the bit stream against errors.

For example, consider the H.264/AVC video compression standard (e.g., see, ITU-T Recommendation H.264: "Advanced video coding for generic audiovisual services", ISO/IEC 14496-10 (2005): "Information Technology—Coding of audio-visual objects Part 10: Advanced Video Coding"), random access points (also referred to as switching enabling points) can be implemented by coding methods including IDR (Instantaneous Decoder Refresh) slices, intra-coded macro blocks (MBs) and SI (switching I) slices.

With respect to an IDR slice, the IDR slice contains only intra-coded MBs, which does not depend on any previous slice for correct decoding. An IDR slice also resets the decoding picture buffer at the decoder so that the decoding of following slices is independent of any slice before the IDR slice. Since correct decoding is immediately available after an IDR slice, it is also called an instantaneous random access point. By contrast, gradual random access operation can be realized based on intra-coded MBs. For a number of consecutive predictive pictures, intra-coded MBs are methodically encoded so that after decoding these pictures, each MB in the following picture has an intra-coded co-located counterpart in one of pictures. Therefore, the decoding of the picture does not depend on any other slice before the set of pictures. Similarly, SI slices enable switching between different bit streams by embedding this type of specially encoded slices into a bit stream. Unfortunately, in H.264/AVC, a common disadvantage of the IDR slice or the SI slice is the loss of coding efficiency since they are usually larger than a compressed picture of other types. Commonly, a significant amount of bit rate overhead has to be paid for embedding switching points.

Similarly, random access points are also used in Scalable Video Coding (SVC). In SVC a dependency representation may consist of a number of layer representations, and an access unit consists of all the dependency representations corresponding to one frame number (e.g., see Y-K. Wang, M. Hannuksela, S. Pateux, A. Eleftheriadis, and S. Wenger, "System and transport interface of SVC", IEEE Trans. Circuits and Systems for Video Technology, vol. 17, no. 9, September 2007, pp. 1149-1163; and H. Schwarz, D. Marpe and T. Wiegand, "Overview of the scalable video coding extension of the H.264/AVC standard", IEEE Trans. Circuits and Systems for Video Technology, vol. 17, no. 9, September 2007, pp. 1103-1120).

A common method for SVC to embed a random access point is to code an access unit entirely using IDR slices. In particular, when a higher layer representation (a layer representation with larger dependency_id value) is encoded in an IDR picture, all the lower layer representation(s) (layer representation(s) with smaller dependency_id value(s)) are encoded also in IDR picture(s). This is because when the lower layer representations are coded in IDR pictures, the higher layer representation can potentially utilize better inter-layer predication, when it is encoded in the IDR picture itself. An example is shown in FIG. 1. The SVC coded signal of FIG. 1 has two dependency representations, and each dependency representation has one layer representation. In particular, the base layer is associated with D=0 and an enhancement layer is associated with D=1 (the value of "D" also referred to in the art as a "dependency_id"). FIG. 1 illustrates nine access units, which occur in frames of the SVC signal. As illustrated by dashed box 10, access unit 1 comprises an IDR slice for the first layer (D=1) and an IDR slice for the base layer (D=0). The following access unit, comprises two predicted (P) slices. It can be observed from FIG. 1 that access units 1, 5 and 9 only comprise IDR slices. As such, random access can occur at these access units. However, like H.264/AVC case, each access unit encoded with IDR slices decreases SVC coding efficiency since an IDR slice is usually larger than a compressed picture of other types.

SUMMARY OF THE INVENTION

We have observed that when Scalable Video Coding (SVC) is used to support fast channel change, the generated bit stream includes a base layer, which is used for channel change, and one or more enhancement layers which are used as regular video streams. Since the base layer and enhancement layers are bounded to the same channel and are expected to be used together during a channel change period, the transport of such an SVC bit stream using the Real-Time Transport Protocol (RTP) requires different considerations than the transport of generic SVC bit streams.

Therefore, and in accordance with the principles of the invention, a method for transmitting a video signal comprises selecting a first scalable layer of a scalable video coded (SVC) signal as a channel change layer; the first scalable layer having an associated dependency_id value that is less than an associated dependency_id value of a second scalable layer of the scalable video coded signal; and transmitting the scalable video coded signal in packet form using the Real-time Transport Protocol (RTP) such that non-random access point slices are conveyed in Simple Time Aggregation Packets (STAP), each Simple Time Aggregation Packet comprising a Payload Content Scalability Information (PACSI) Network Abstraction Layer (NAL) Unit. As a result, this invention provides a practical RTP packetization method that can improve the transmission efficiency and the Quality of Experience (QoE) for fast channel change using SVC, while imposing minimum impact on Media Aware Network Elements (MANEs) to perform media-aware stream selection.

In an illustrative embodiment of the invention, the SVC signal comprises a base layer and an enhancement layer and the base layer is chosen as having more random access points, e.g., IDR slices, than the enhancement layer. Transmission of the SVC signal occurs in packet form using RTP such that non-random access point slices are conveyed in STAP Packets, each STAP Packet comprising a PACSI NAL Unit. The PACSI NAL unit comprises a three bit dependency_id "DID" field that is set to the lowest value of the DID values of all the remaining NAL units in the payload of the STAP packet. In addition, the PACSI NAL unit comprises a two bit reserved bits (RR) field that is set to the highest value of the DID values of the DID values of all the remaining NAL units in the payload of the STAP packet. As a result, by comparing the "DID" field value with the "RR" field value, it can quickly be determined if all the NAL Units in the STAP packet belong to the same layer or if the NAL Units in the STAP packet relate to different layers.

In another illustrative embodiment of the invention, an SVC encoder provides an SVC signal comprising a base layer and an enhancement layer and the base layer is chosen as having more random access points, e.g., IDR slices, than the enhancement layer and wherein the SVC encoder decides as a function of coding efficiency if in those access units where the enhancement layer has an IDR slice, the base layer has a non-IDR slice. Transmission of the SVC signal occurs in packet form using RTP such that non-random access point slices are conveyed in STAP Packets, each STAP Packet comprising a PACSI NAL Unit. The PACSI NAL unit comprises a three bit dependency_id "DID" field that is set to the lowest value of the DID values of all the remaining NAL units in the payload of the STAP packet. In addition, the PACSI NAL unit comprises a two bit reserved bits (RR) field that is set to the highest value of the DID values of the DID values of all the remaining NAL units in the payload of the STAP packet. As a result, by comparing the "DID" field value with the "RR" field value, it can quickly be determined if all the NAL Units in the STAP packet belong to the same layer or if the NAL Units in the STAP packets relate to different layers.

In view of the above, and as will be apparent from reading the detailed description, other embodiments and features are also possible and fall within the principles of the invention.

BRIEF DESCRIPTION OF THE DRAWINGS

FIG. 10 shows a modified PACSI NAL Unit in accordance with the principles of the invention.

DETAILED DESCRIPTION

Figure 1:
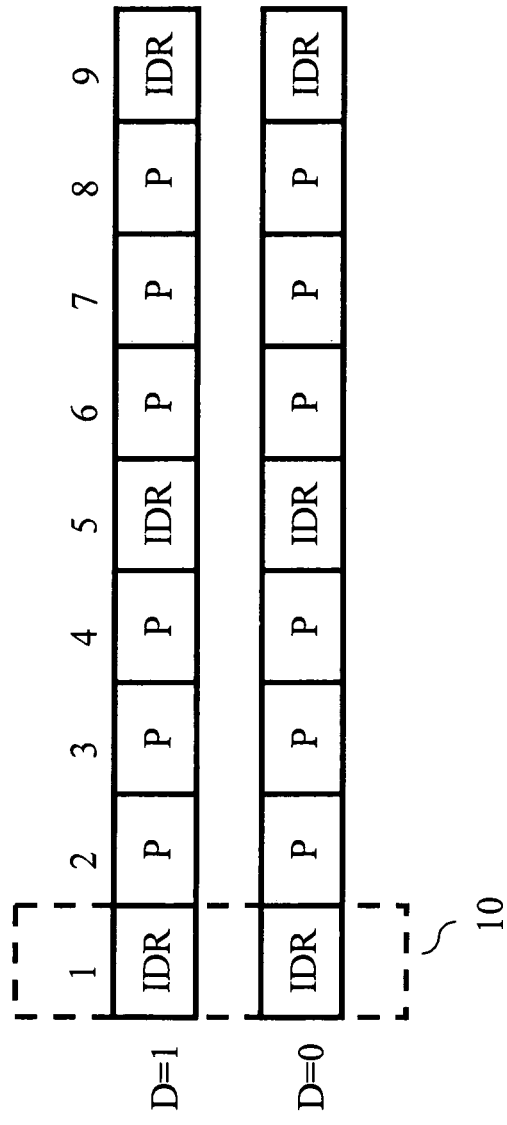
FIG. 1 shows a prior art scalable video coded (SVC) signal having Instantaneous Decoder Refresh (IDR) slices.

Other than the inventive concept, the elements shown in the figures are well known and will not be described in detail. For example, other than the inventive concept, familiarity with Discrete Multitone (DMT) transmission (also referred to as Orthogonal Frequency Division Multiplexing (OFDM) or Coded Orthogonal Frequency Division Multiplexing (COFDM)) is assumed and not described herein. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC), Chinese Digital Television System (GB) 20600-2006 and DVB-H is assumed. Likewise, other than the inventive concept, other transmission concepts such as eight-level vestigial sideband (8-VSB), Quadrature Amplitude Modulation (QAM), and receiver components such as a radio-frequency (RF) front-end (such as a low noise block, tuners, down converters, etc.), demodulators, correlators, leak integrators and squarers is assumed. Further, other than the inventive concept, familiarity with protocols such as the File Delivery over Unidirectional Transport (FLUTE) protocol, Asynchronous Layered Coding (ALC) protocol, Internet protocol (IP) and Internet Protocol Encapsulator (IPE), is assumed and not described herein. Similarly, other than the inventive concept, formatting and encoding methods (such as Moving Picture Expert Group (MPEG)-2 Systems Standard (ISO/IEC 13818-1), and the above-mentioned SVC) for generating transport bit streams are well-known and not described herein. It should also be noted that the inventive concept may be implemented using conventional programming techniques, which, as such, will not be described herein. Finally, like-numbers on the figures represent similar elements.

As noted earlier, when a receiver initially turns on, or even during a channel change or even if just changing services within the same channel, the receiver may have to additionally wait for the required initialization data before being able to process any received data. As a result, the user has to wait an additional amount of time before being able to access a service or program. As described herein, the terms "channel change", "tune-in", "changing services" are equivalent since they all represent switching to a new program.

In SVC, an SVC signal can contain a number of dependency (spatial) layers, where each dependency layer may consist of one, or more temporal and/or quality scalable layers of the SVC signal with the same dependency_id value. The base layer (dependency_id=0) represents a minimum level of resolution for the video signal. Other layers (dependency_id>0) represent increasing layers of resolutions for the video signal." For example, if an SVC signal comprises three layers, there is a base layer, a layer 1 and a layer 2. Each layer is associated with a different dependency_id value. A receiver can process just (a) the base layer, (b) the base layer and layer 1 or (c) the base layer, layer 1 and layer 2. For example, the SVC signal can be received by a device that only supports the resolution of the base signal and, as such, this type of device can simply ignore the other two layers of the received SVC signal. Conversely, for a device that supports the highest resolution, then this type of device can process all three layers of the received SVC signal.

In SVC, the encoding of an IDR picture is done independently for each layer. As such, and in accordance with the principles of the invention, a method for transmitting a video signal comprises selecting a first scalable layer of a scalable video coded (SVC) signal as a channel change layer; the first scalable layer having an associated dependency_id value that is less than an associated dependency_id value of a second scalable layer of the scalable video coded signal; scalable video coding the video signal for providing the scalable video coded signal such that for at least a portion of the scalable video coded signal random access points in the first scalable layer and random access point in the second scalable layer occur in different access units; and transmitting the scalable video coded signal. As a result, a video encoder can reduce tune-in delay and channel-change delay in a receiver by embedding additional switching enabling points within a compressed video bit stream and further reduce the overall bit rate.

In an illustrative embodiment of the invention, the SVC signal comprises a base layer and an enhancement layer and the base layer is chosen as having more random access points, e.g., IDR slices, than the enhancement layer and in those access units where the enhancement layer has an IDR slice, the base layer has a non-IDR slice. Although the inventive concept is illustrated in the context of two layers, the inventive concept is not so limited and more that two scalable layers may be present.

Figure 2:
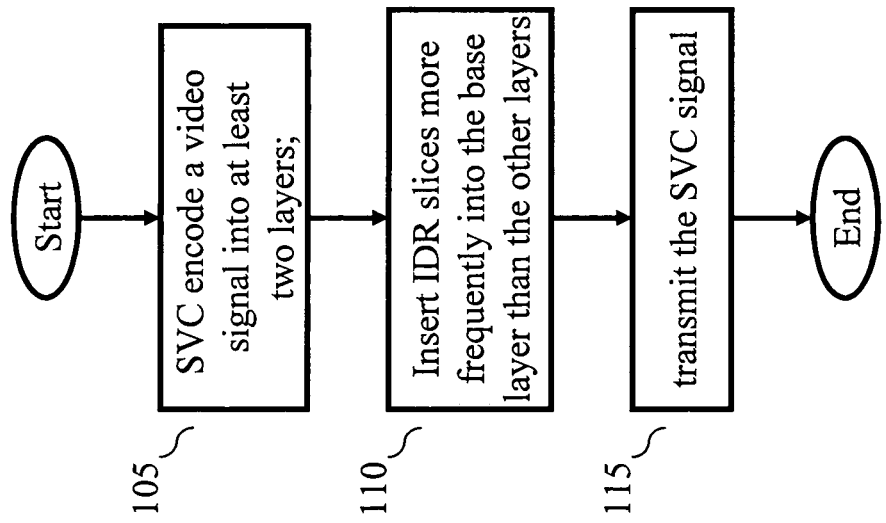
FIG. 2 shows an illustrative flow chart for use in SVC encoding.

Before describing the inventive concept, a flow chart for use in a scalable video encoder for reducing tune-in delay and channel-change is shown in FIG. 2. In step 105, a scalable video encoder encodes a video signal into an SVC signal comprising a base layer and at least one other layer. In particular, in step 110, the scalable video encoder encodes the video signal such that IDR slices are inserted more frequently into the base layer than any other layer of the resulting SVC signal. For example, the scalable video encoder is responsive to a coding parameter that is similar to existing coding patterns IBBP or IPPP, except that this coding parameter specifies different IDR intervals at different spatial layers. Finally, in step 115, the SVC signal is transmitted.

Figure 3:
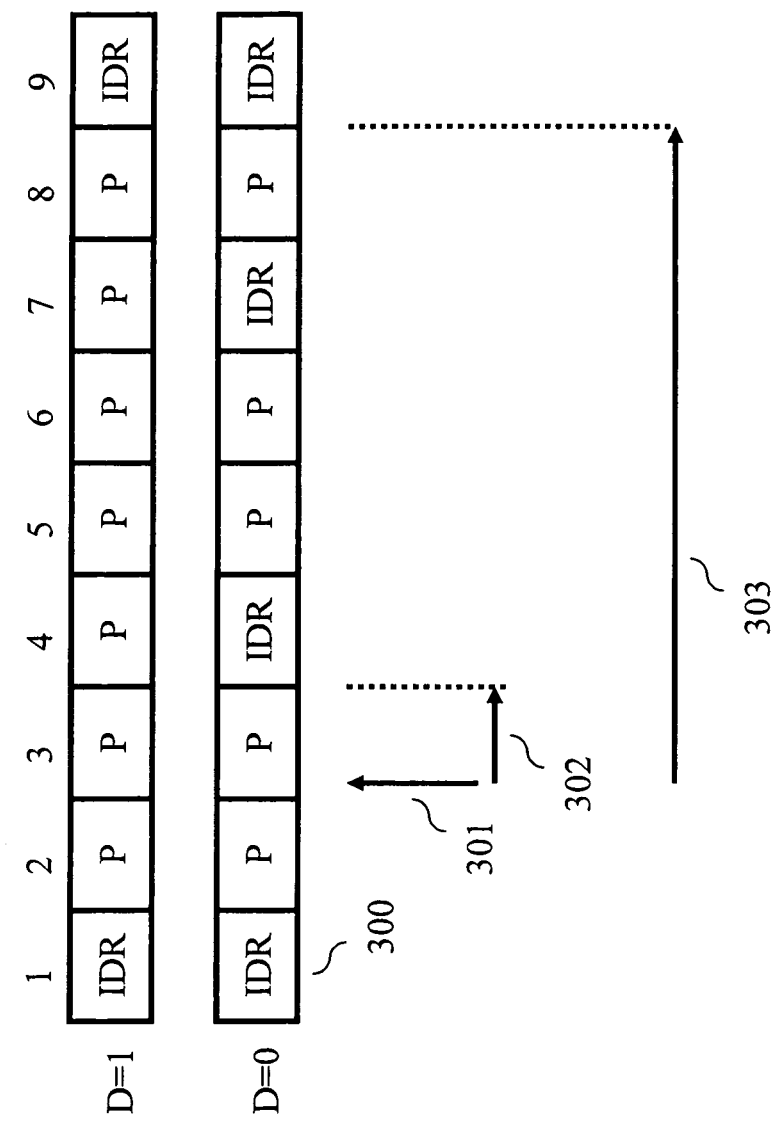
FIG. 3 shows an illustrative SVC signal.

Referring now to FIG. 3, an illustrative SVC signal 111 formed by an SVC encoder performing the steps of the flow chart of FIG. 2 is shown. In this example, SVC signal 111 comprises two layers, a base layer (D=0) and an enhancement layer (D=1). As can be observed from FIG. 3 the base layer has IDR slices in access units 1, 4, 7 and 9; while the enhancement layer only has IDR slices in access unit 1 and 9. As such, when a receiving device changes (or first tunes) to a channel that conveys SVC signal 111 at a time $T_c$ as illustrated by arrow 301, the receiving device only has to wait a time $T_w$ as represented by arrow 302 before being able to begin decoding the base layer of SVC signal 111 and provide a reduced resolution video picture to a user. Thus, the receiver can reduce tune-in delay and channel-change delay by immediately decoding the base layer video encoded signal, which has more random access points. As can be further observed from FIG. 3, the receiver has to wait a time $T_D$ as represented by arrow 303 before being able to decode the enhancement NAL layer and provide a higher resolution video picture to the user.

When compared to the example shown in FIG. 1, where both layers have the same IDR frequency, the method of FIG. 2 provides the ability to realize the same set of functionality improvements, but at lower bit rate with only limited performance loss. This is especially true when the base layer takes only a small portion of the total bit rate of the bit stream. For example, for a Common Intermediate Format (CIF) (372× 288) resolution as the base layer (D=0) and standard definition (SD) (720×480) resolution as the enhancement layer (D=1), the base layer takes only a small percentage (e.g., around 25%) of the total bit rate. So, by increasing IDR frequency at CIF resolution, the bit rate overhead is far less compared to increasing IDR frequency at the enhancement layer only, or at both layers. Unfortunately, each access unit encoded with IDR slices still decreases SVC coding efficiency since an IDR slice is usually larger than a compressed picture of other types.

In addition, we have observed that when Scalable Video Coding (SVC) is used to support fast channel change, the generated bit stream includes a base layer, which is used for channel change, and one or more enhancement layers which are used as regular video streams. Since the base layer and enhancement layers are bounded to the same channel and are expected to be used together during a channel change period, the transport of such an SVC bit stream using the Real-Time Transport Protocol (RTP) requires different considerations than the transport of generic SVC bit streams.

A Video Coding Layer (VCL) of an SVC encoder generates encoded information that is stored in Network Abstraction Layer (NAL) units. When the SVC bit stream is transmitted over a network that employs a Real-time Transport Protocol (RTP)/(User Datagram Protocol (UDP)/Internet Protocol (IP) protocol stack, the NAL units inside the bit stream have to be packetized into Real-time Transport Protocol (RTP) packets according to the SVC packetization as described in IETF AVT draft: "RTP Payload Format for SVC Video draft-ietf-avt-rtp-svc-13.txt".

The above-mentioned IETF AVT draft defines a number of NAL types that can be used for transmitting an SVC coded video stream in a single session/non-interleaved mode. One NAL type is the Single NAL unit (SNU). The SNU can only load one SVC NAL unit in an RTP packet. Another NAL type is the Simple-Time Aggregation Packet (STAP-A). The STAP-A (also referred to herein as simply an STAP packet) can load multiple SVC NAL units that have the same presentation time instance (or equivalently, belong to the same access unit) in one RTP packet, in the same order as their corresponding decoding order. Yet another NAL type is the Non-interleaved Multi-Time Aggregation Packet (NI-MTAP). The NI-MTAP can load multiple SVC NAL units that have different presentation time instances (or equivalently, belong to different access units) in one RTP packet, in the same order as their corresponding decoding order. The Fragmentation Unit-A (FU-A) NAL type is used to split an overly large NAL unit into multiple RTP packets. Finally, there is the Payload Content Scalability Information (PACSI) NAL type. The PACSI facilitates packetization and indicates scalability information and other characteristics that are common for all the remaining NAL units in the payload of an aggregation packet. However, so far there is no standard way or rule that suggests a packetization format that is suitable for fast channel change using SVC.

In view of the above, we have made a number of observations with regard to existing multicast based fast change solutions. First, existing multicast based fast channel change solutions often use two separated RTP sessions: one is to transmit a regular video stream and the other to transmit a channel change stream. When a channel change happens, the end user sends IGMP join/leave requests for both multicast RTP sessions.

However, when SVC is used for fast channel change, we propose to use a single multicast RTP session with same SSRC (synchronization source), timestamp and sequence number space for both the channel change and the regular video streams. This approach reduces not only the needed number of Internet Protocol (IP) addresses by half, but also reduces the number of messages that need to be exchanged during the channel change process. Other advantages can also include, for example, simple firewall configuration, less complexity in decoding order recovery process, etc.

In addition, we have observed that if MTAP packetization is used in the above-described SVC encoding method shown in the flow chart of FIG. 2, the decoding of the first full-resolution picture can be delayed because the MTAP packetization can have different presentation time instances (or equivalently, belong to different access units) in one RTP packet, in the same order as their corresponding decoding order. Thus, multiple MTAP packets may have to be received before decoding can begin. As a result, MTAP packetization increases the tune-in delay even if more random access points are inserted into the base stream. In contrast, we have observed that if STAP packetization is always required to be used for conveying non-IDR slices than the tune-in delay can be reduced.

In particular, an STAP packet conveys non-IDR slices having the same presentation time instance (or equivalently, belong to the same access unit) in one RTP packet, in the same order as their corresponding decoding order. As a result, as soon as a single STAP packet is received, decoding can begin. Therefore, using STAP NAL units to packetize non-IDR slices helps reduce the tune-in delay. In addition, by adopting STAP to packetize layer representations from one access unit but belonging to different layers, the original decoding order can be easily maintained.

We have also observed that Media Aware Network Elements (MANES) must be capable of parsing RTP headers or payload to react to the encapsulated Audio/video content. One example of a MANE is a media gateway that performs processing of NAL headers, RTP/RTCP on top of IP and may duplicate or convert certain type of NAL units if necessary. Therefore, we have observed that by using the payload/header information to identify layers within an RTP session carrying an SVC encoded video stream, the MANE can aggregate multiple RTP streams, and perform media-aware stream thinning (selective elimination of packets or portions) from the incoming RTP packet stream. In particular, if a modified PACSI NAL unit is included in each STAP packet, MANEs can extract the necessary information, such as layering and dependency, possibly without parsing the NAL headers further into the RTP packet.

Therefore, in accordance with the principles of the invention, a method for transmitting a video signal comprises selecting a first scalable layer of a scalable video coded (SVC) signal as a channel change layer; the first scalable layer having an associated dependency_id value that is less than an associated dependency_id value of a second scalable layer of the scalable video coded signal; and transmitting the scalable video coded signal in packet form using the Real-time Transport Protocol (RTP) such that non-random access point slices are conveyed in Simple Time Aggregation Packets (STAP), each Simple Time Aggregation Packet comprising a Payload Content Scalability Information (PACSI) Network Abstraction Layer (NAL) Unit. As a result, this invention provides a practical RTP packetization method that can improve the transmission efficiency and the Quality of Experience (QoE) for fast channel change using SVC, while imposing minimum impact on Media Aware Network Elements (MANEs) to perform media-aware stream selection.

Figure 4:
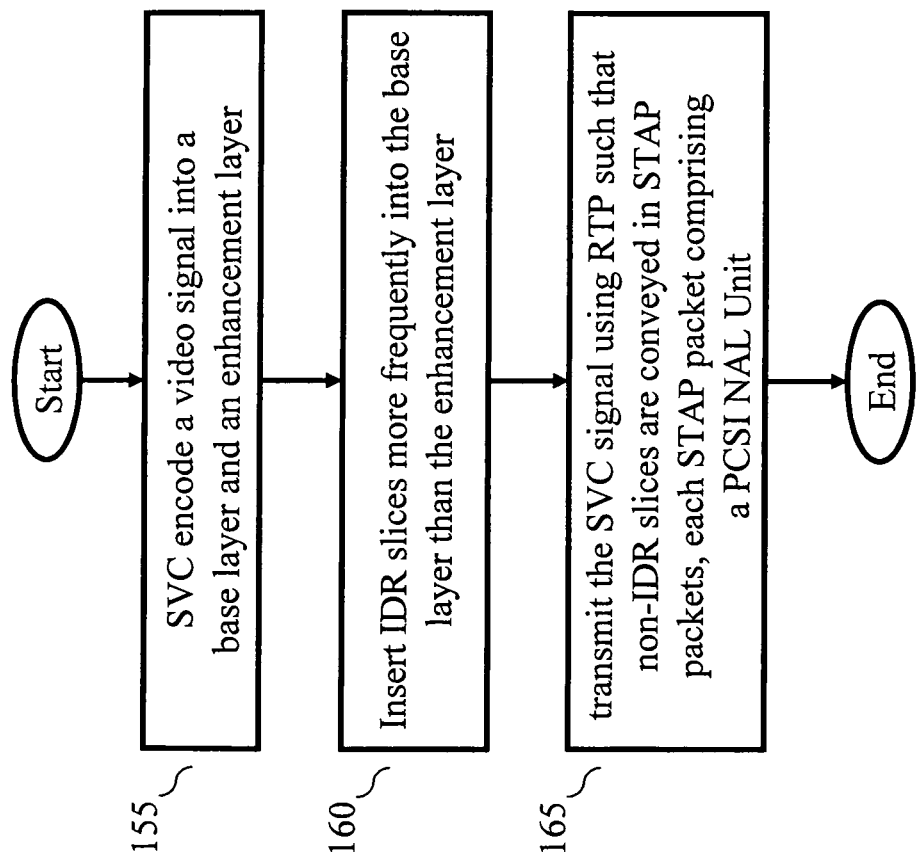
FIG. 4 shows an illustrative flow chart for use in SVC encoding in accordance with the principles of the invention.

An illustrative flow chart in accordance with the principles of the invention is shown in FIG. 4. Attention should also briefly be directed to FIG. 5, which illustrates an illustrative apparatus 200 for encoding a video signal in accordance with the principles of the invention. Only those portions relevant to the inventive concept are shown. Apparatus 200 is a processor-based system and includes one, or more, processors and associated memory as represented by processor 240 and memory 245 shown in the form of dashed boxes in FIG. 5. In this context, computer programs, or software, are stored in memory 245 for execution by processor 240 and, e.g., implement SVC encoder 205. Processor 240 is representative of one, or more, stored-program control processors and these do not have to be dedicated to the transmitter function, e.g., processor 240 may also control other functions of the transmitter. Memory 245 is representative of any storage device, e.g., random-access memory (RAM), read-only memory (ROM), etc.; may be internal and/or external to the transmitter; and is volatile and/or non-volatile as necessary.

Apparatus 200 comprises SVC encoder 205 and modulator 210. A video signal 204 is applied to SVC encoder 205. The latter encodes the video signal 204 in accordance with the principles of the invention and provides SVC signal 206 to modulator 210. Modulator 210 provides a modulated signal 211 for transmission via an upconverter and antenna (both not shown in FIG. 5).

Figure 5:
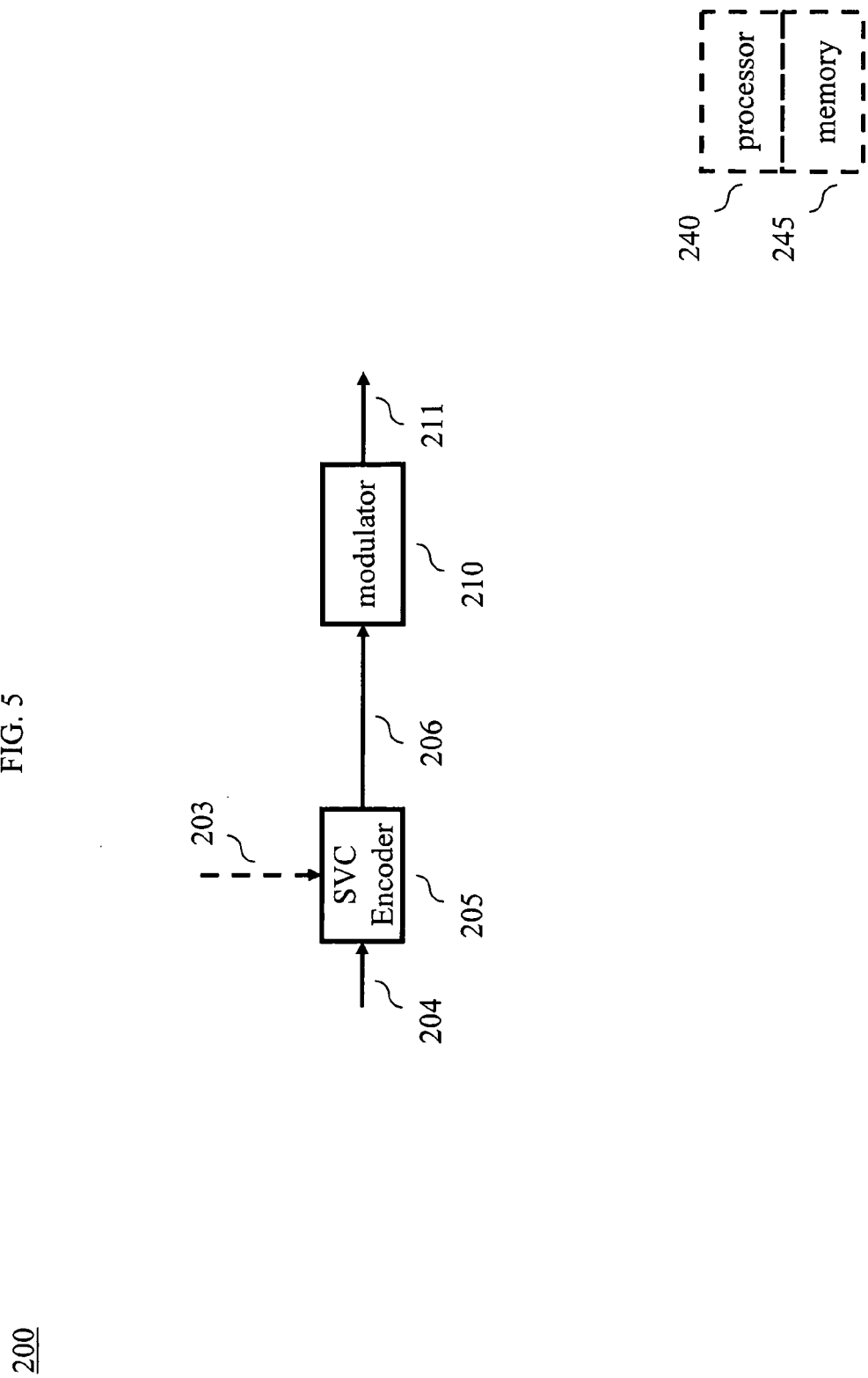
FIG. 5 shows an illustrative embodiment of an apparatus in accordance with the principles of the invention.

Returning now to FIG. 4, in step 155 processor 240 of FIG. 5 encodes video signal 204 into SVC signal 206 comprising a base layer and an enhancement layer. In particular, in step 160, processor 240 controls SVC encoder 205 of FIG. 5 (e.g., via signal 203 shown in dashed line form in FIG. 5) such that IDR slices are inserted more frequently into the base layer than the enhancement layer of SVC signal 206 and, in addition, when two IDR slices occur in the same access unit, the base layer is encoded with a non-IDR slice. In particular, a coding parameter is applied to SVC encoder 205 just like specifying coding patterns IBBP or IPPP, that specifies different IDR intervals at different spatial layers. In step 165, modulator 210 of FIG. 5 transmits the SVC signal in packet form using RTP such that non-IDR slices are conveyed in STAP packets, each STAP packet comprising a modified PACSI NAL Unit (described below). It should be noted that IDR slices are most likely to be packetized into RTP packets in FU type, because a coded IDR picture often takes more than MTU (Maximum Transmission Unit) bytes of a typical network (for example, 1500 bytes for Ethernet). It should be noted that although the packetization function is described as being preformed in the modulator, the inventive concept is not so limited, and may be performed in other parts of the transmitter as represented by apparatus 200.

An illustrative PACSI NAL Unit structure modified in accordance with the principles of the invention is shown in FIG. 10. The PACSI NAL unit comprises a three bit dependency_id "DID" field (498) that is set, in step 165 of FIG. 4, to the lowest value of the DID values of all the remaining NAL units in the payload of the STAP packet. In addition, the PACSI NAL unit comprises a two bit reserved bits (RR) field (499) that, in accordance with the principles of the invention, is set, in step 165 of FIG. 4, to the highest value of the DID values of the DID values of all the remaining NAL units in the payload of the STAP packet. As a result, by comparing the "DID" field value with the "RR" field value, it can quickly be determined if all the NAL Units in the STAP packet belong to the same layer or if the NAL Units in the STAP packets relate to different layers. Thus, e.g., by examining the values in these two fields a MANE can quickly determine if all the NAL units in the aggregation packet belong to the same layer and decide to forward or discard the entire aggregation packet as a whole. However, in the case where the RR field value is different from the DID field value, this indicates that more than one scalable layers is aggregated in the STAP payload. As a result, the MANE needs to further parse each NAL unit header and NAL unit size that follows the PACSI NAL unit to decide which portion of the payload can be forwarded or discarded.

Figure 6:
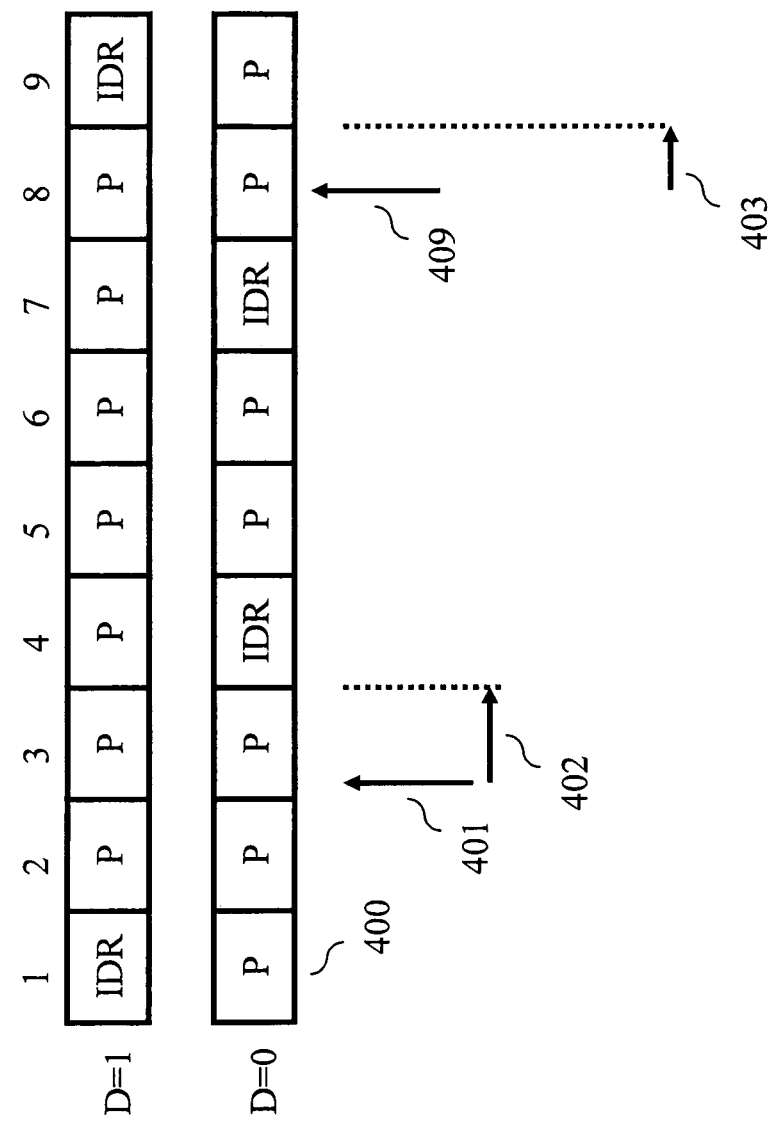
FIG. 6 shows an illustrative SVC signal in accordance with the principles of the invention.

Referring now to FIG. 6, an illustrative SVC signal 206 formed by an SVC encoder performing the steps of the flow chart of FIG. 4 is shown. In this example, SVC signal 206 comprises two layers, a base layer (D=0) and an enhancement layer (D=1). As can be observed from FIG. 6 the base layer has IDR slices in access units 4 and 7; while the enhancement layer has IDR slices in access units 1 and 9. In accordance with the principles of the invention, in access units 1 and 9, the base layer is encoded with a non-IDR slice. It should be observed that although the SVC encoder provided a base layer having more random access points than the enhancement layer (e.g., there are two IDR slices in access units 4 and 7 for the base layer before the appearance of an IDR slice in access unit 9 of the enhancement layer), the inventive concept is not so limited. For example, the SVC encoding can be performed such that IDR slices in the channel change layer simply occur at different times than IDR slices in layers with higher dependency_id values. This could, in effect, result in the number of IDR slices in, e.g., the base layer and an enhancement layer, being the same.

Continuing with a description of FIG. 6, when a receiving device changes (or first tunes) to a channel that conveys SVC signal 206 at a time $T_c$ as illustrated by arrow 401, the receiving device only has to wait a time $T_w$ as represented by arrow 402 before being able to begin decoding the base layer of SVC signal 206 and provide a reduced resolution video picture to a user. Thus, the receiver can reduce tune-in delay and channel-change delay by immediately decoding the base layer video encoded signal, which has more random access points. As can be further observed from FIG. 6, should the channel change occur at a time $T_F$ as represented by arrow 409, the receiver only has to wait a time $T_G$ as represented by arrow 403 before being able to decode the enhancement layer and provide a higher resolution video picture to the user.

Figure 7:
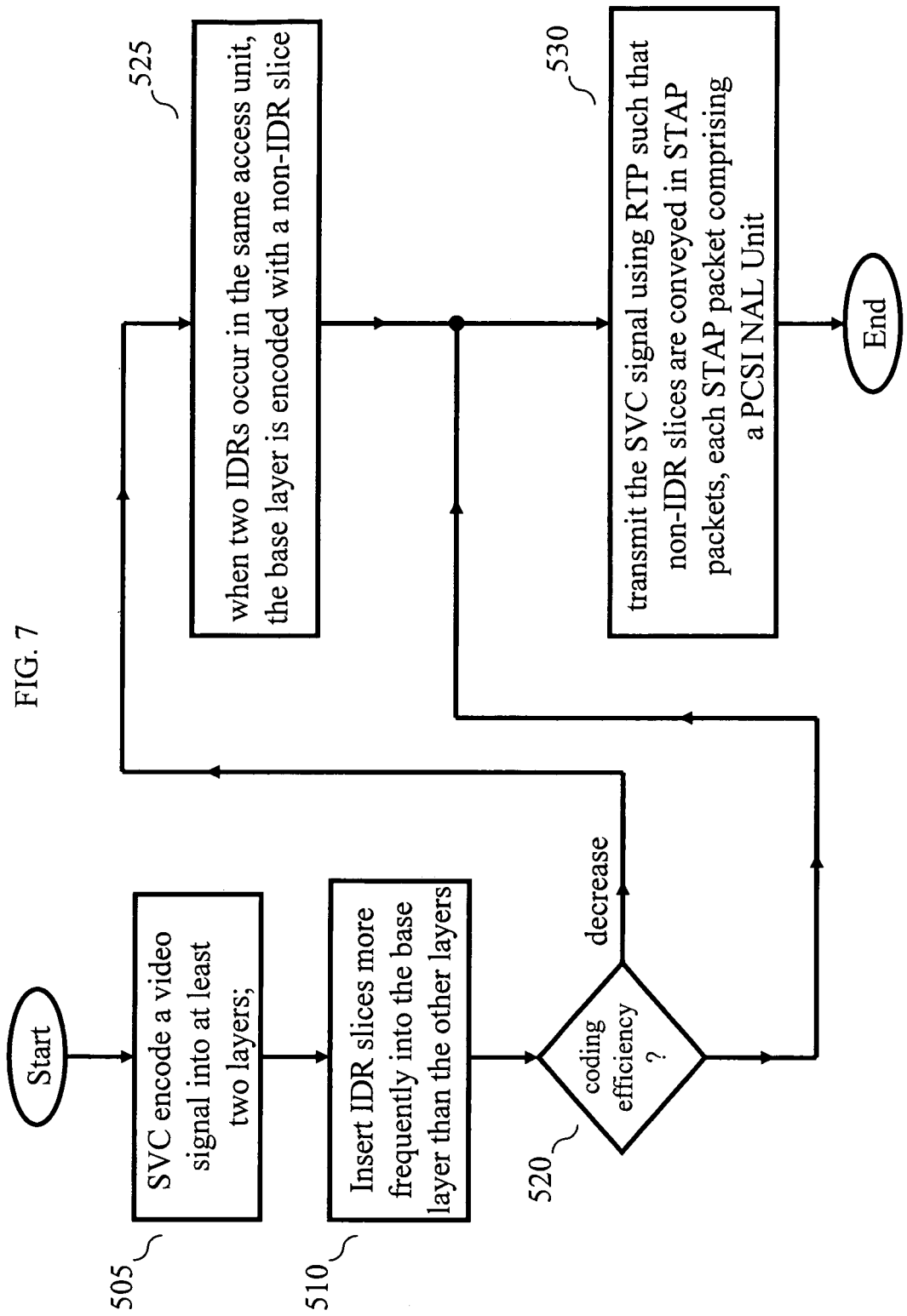
FIG. 7 shows another illustrative flow chart for use in SVC encoding in accordance with the principles of the invention.

Turning now of FIG. 7, another illustrative embodiment of the invention is shown. The flow chart of FIG. 7 illustrates an SVC encoder (e.g., SVC encoder 205 of FIG. 5) that provides an SVC signal comprising a base layer and an enhancement layer and where the base layer is chosen as having more random access points, e.g., IDR slices, than the enhancement layer and wherein the SVC encoder decides as a function of coding efficiency if in those access units where the enhancement layer has an IDR slice, the base layer has a non-IDR slice. As a result, the resulting SVC encoded signal may, or may not, have an access unit where a lower layer is encoded with a non-IDR slice and an upper layer is encoded with an IDR slice in at least a portion of the SVC encoded signal. In step 505, a scalable video encoder encodes a video signal into an SVC signal comprising a base layer and at least one other layer. In particular, in step 510, the scalable video encoder encodes the video signal such that IDR slices are inserted more frequently into the base layer than any other layer of the resulting SVC signal. For example, the scalable video encoder is responsive to a coding parameter that is similar to existing coding patterns IBBP or IPPP, except that this coding parameter specifies different IDR intervals at different spatial layers. In step 520, the SVC encoder checks the resulting coding efficiency, e.g., if the bitrate for encoding the whole access unit as IDR slices is higher than that of encoding the base layer as a non-IDR slice and the upper layer as an IDR slice. If the bit rate is not higher, then, in step 530, the SVC signal is transmitted. It again should be noted that IDR slices are most likely to be packetized into RTP packets in FU type, because a coded IDR picture often takes more than MTU. However, if the bit rate is higher, then, in step 525, in those access units where two IDR slices occur in the same access unit, the SVC encoder replaces the base layer with a non-IDR slice to increase coding efficiency and then the SVC signal is transmitted in step 530 in packet form using RTP such that non-IDR slices are conveyed in STAP packets, each STAP packet comprising a modified PACSI NAL Unit with the DID fields and RR fields appropriately set as described earlier.

It should be noted that the flow charts of FIGS. 2, 4 and 7 represents a higher layer of processing by apparatus 200. For example, while a portion of the video signal is being SVC encoded, a portion of the SVC encoded signal may be transmitted at the same time. Also, although illustrated in the context of a base layer and a single enhancement layer, the flow charts of FIGS. 4 and 7 are easily extendible to more than one upper layer.

Figure 8:
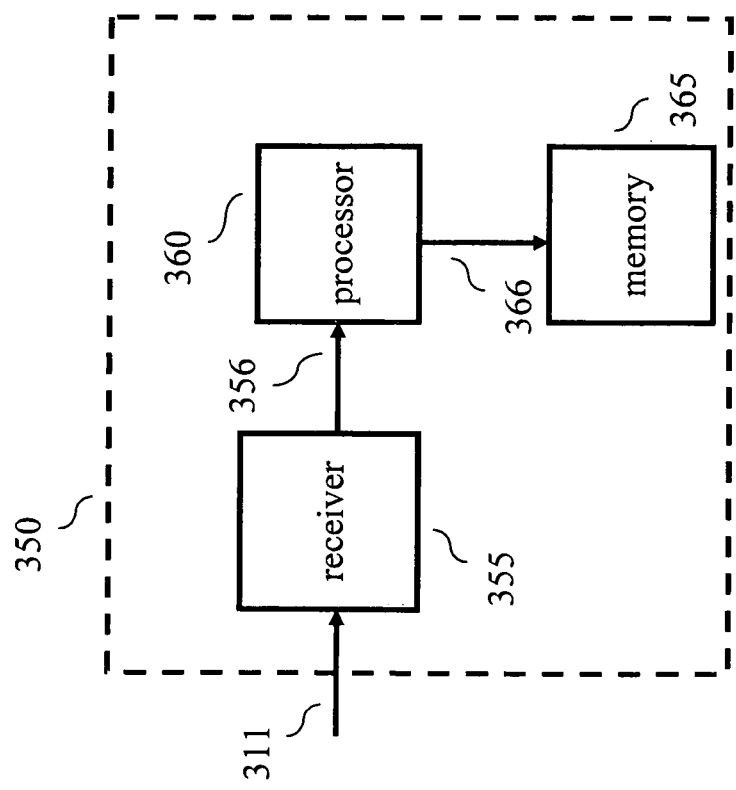
FIG. 8 shows another illustrative embodiment of an apparatus in accordance with the principles of the invention.

Referring now to FIG. 8, an illustrative apparatus for receiving an SVC signal in accordance with the principles of the invention is shown. Only those portions relevant to the inventive concept are shown. Apparatus 350 receives a signal conveying an SVC signal in accordance with the principles of the invention as represented by received signal 311 (e.g., this is a received version of the signal transmitted by apparatus 200 of FIG. 5). Apparatus 350 is representative of, e.g., a cellphone, mobile TV, set-top box, digital TV (DTV), etc. Apparatus 350 comprises receiver 355, processor 360 and memory 365. As such, apparatus 350 is a processor-based system. Receiver 355 represents a front-end and a demodulator for tuning into a channel that conveys an SVC signal. Receiver 355 receives signal 311 and recovers therefrom signal 356, which is processed by processor 360, i.e., processor 360 performs SVC decoding. For example, and in accordance with the flow chart shown in FIG. 9 (described below) for channel switch and channel tune-in in accordance with the principles of the invention, processor 360 provides decoded video to memory 365, via path 366. Decoded video is stored in memory 365 for application to a display (not shown) that can be a part of apparatus 350 or separate from apparatus 350.

Figure 9:
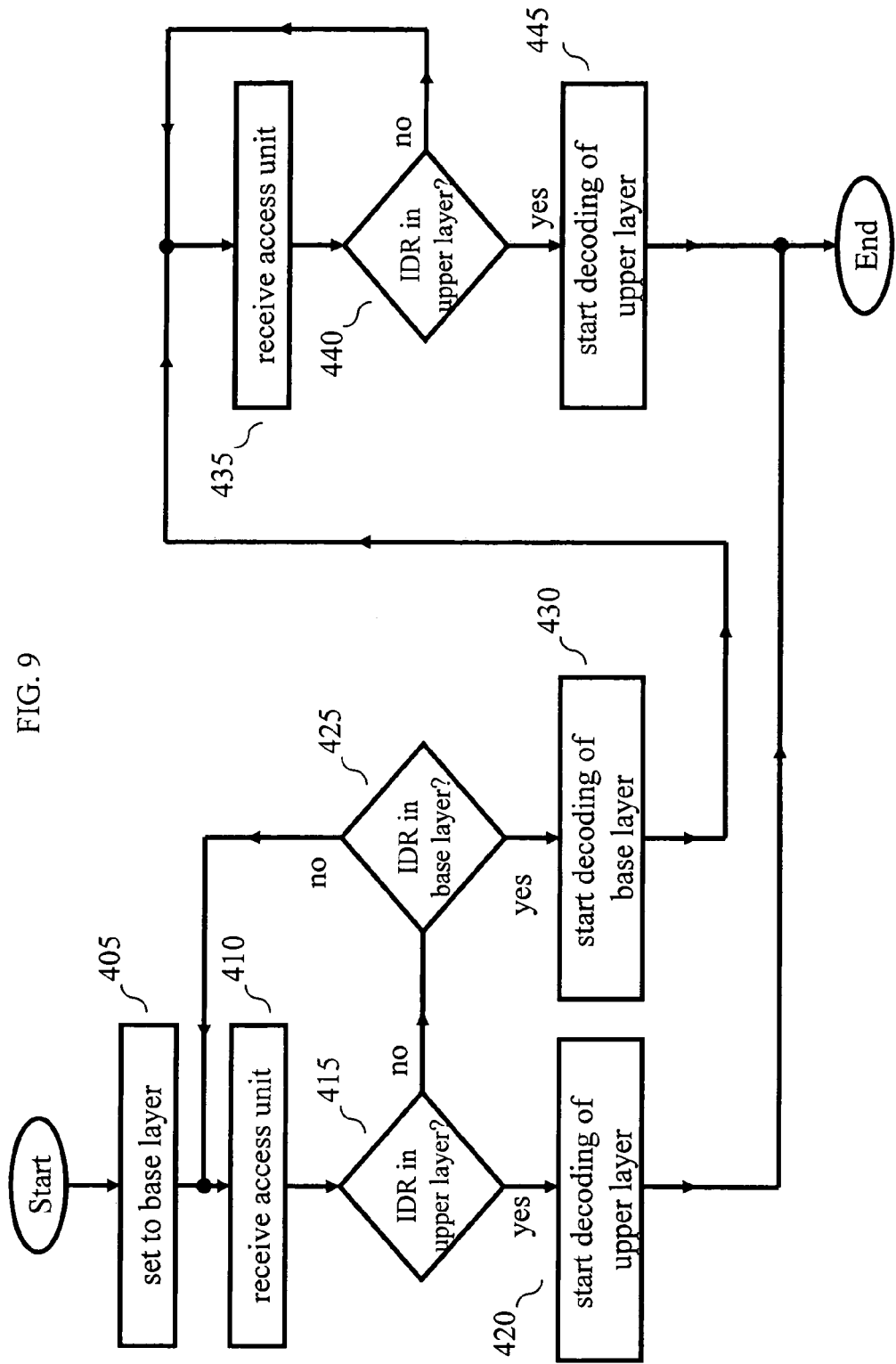
FIG. 9 shows another illustrative flow chart in accordance with the principles of the invention.

Turning now to FIG. 9, an illustrative flow chart in accordance with the principles of the invention for use in apparatus 350 is shown. In this example, a received SVC signal comprises a base layer and an enhancement layer (upper layer), where the dependency_id value of the base layer is less than the dependency_id value of the enhancement layer. Upon switching channels or tuning into a channel, processor 360 sets decoding to an initial targeted dependency layer, e.g., the designated channel change layer. In this example, this is represented by the base layer of the received SVC signal in step 405. However, the inventive concept is not so limited, and other dependency layers may be designated as the "initial targeted layer". In step 410, processor 360 receives an access unit (also referred to in the art as a received SVC Network Abstraction Layer (NAL) unit) and checks, in step 415, if an upper layer of the received access unit is an IDR slice. If it is not an IDR slice, then processor 360 checks if there is an IDR slice in the base layer of the received access unit in step 425. If there is no IDR in the base layer, then processor 360 returns to step 410 for receiving the next access unit. However, if, in step 415, there is an IDR slice in the upper layer, then processor 360 sets its SVC target representation layer to the enhancement layer and starts decoding when it first receives the IDR picture from the enhancement layer, e.g., the regular video stream, in step 420.

Returning to step 425, if the received base layer is an IDR slice, then processor 360 stars decoding of the SVC base layer in step 430 for providing a video signal albeit at reduced resolution. Then, in step 435, processor 360 receives an access unit and checks, in step 440, if the upper layer of the received access unit is an IDR slice. If it is not an IDR slice, then processor 360 returns to step 435 for receiving the next access unit. However, if the upper layer of the received access unit is an IDR slice, then processor 360 stars decoding of the SVC upper layer in step 445 for providing a video signal at a higher resolution.

In other words, an overview of the flowchart of FIG. 9 is as follows. Upon detection of an. IDR slice in a dependency layer with a value of dependency_id greater than the value of the current decoding layer, the receiver decodes the coded video in that dependency layer with the detected IDR slice. Otherwise, the receiver continues decoding the current dependency layer. As described above, even without an IDR from the base layer, an IDR from an enhancement layer is enough to start decoding of that enhancement layer.

It should be noted that the flow chart of FIG. 9 represents a higher layer of processing by apparatus 350. For example, once decoding of the base layer has started in step 430, this continues by processor 350 even though processor 350 also checks the upper layer for IDR slices in steps 435 and 450. Finally, although illustrated in the context of a base layer and a single enhancement layer, the flow chart of FIG. 9 is easily extendible to more than one upper layer.

As noted above, and in accordance with the principles of the invention, a receiver that processes an RTP (SVC encoded) packet stream can quickly determine if all the NAL units in a received STAP packet belong to the same layer or if more than one layer is conveyed in the STAP payload and, as a result, perform the appropriate processing. This is further illustrated in FIGS. 11 and 12, where the receiver is illustrated by a MANE, although the inventive concept is not so limited. MANE 700 is a processor-based system and includes one, or more, processors and associated memory as represented by processor 740 and memory 745 shown in the form of dashed boxes in FIG. 11. In this context, computer programs, or software, are stored in memory 745 for execution by processor 740. Processor 740 is representative of one, or more, stored-program control processors. Memory 745 is representative of any storage device, e.g., random-access memory (RAM), read-only memory (ROM), etc.; may be internal and/or external to the transmitter; and is volatile and/or non-volatile as necessary. MANE 700 receives an RTP (SVC encoded) packet stream 699, performs processing as necessary, and provides an RTP (SVC encoded) packet stream 701 to other network elements or receiving devices.

Figure 11:
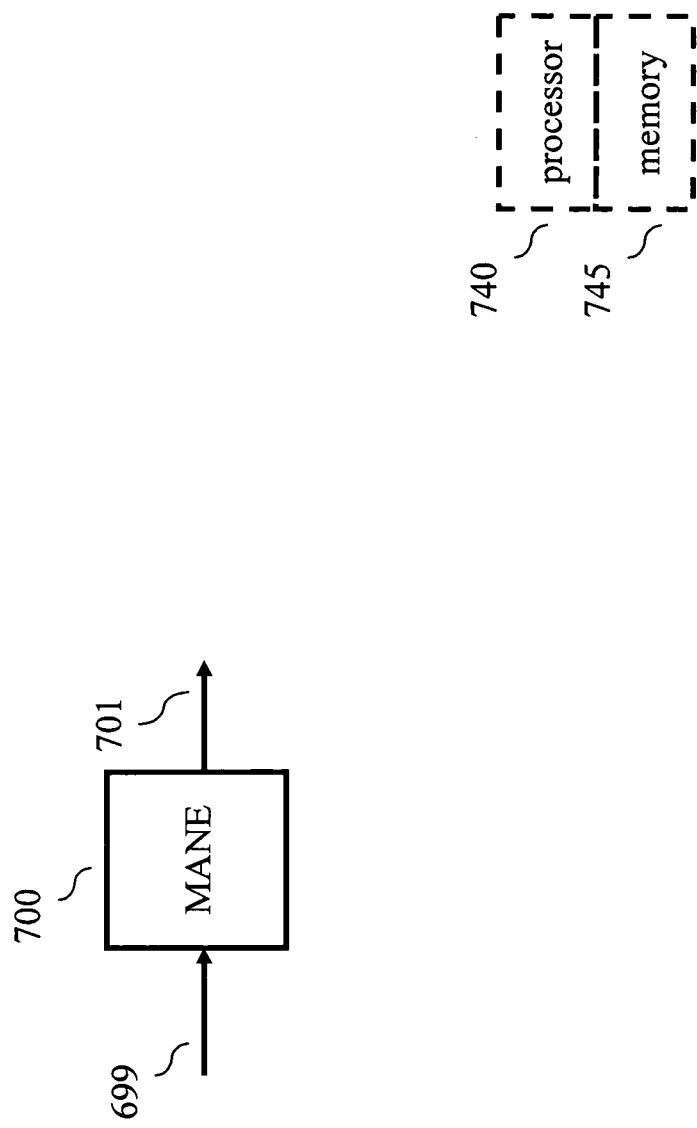
FIGS. 11 and 12 illustrate the principles of the invention in the context of a MANE.
Figure 12:
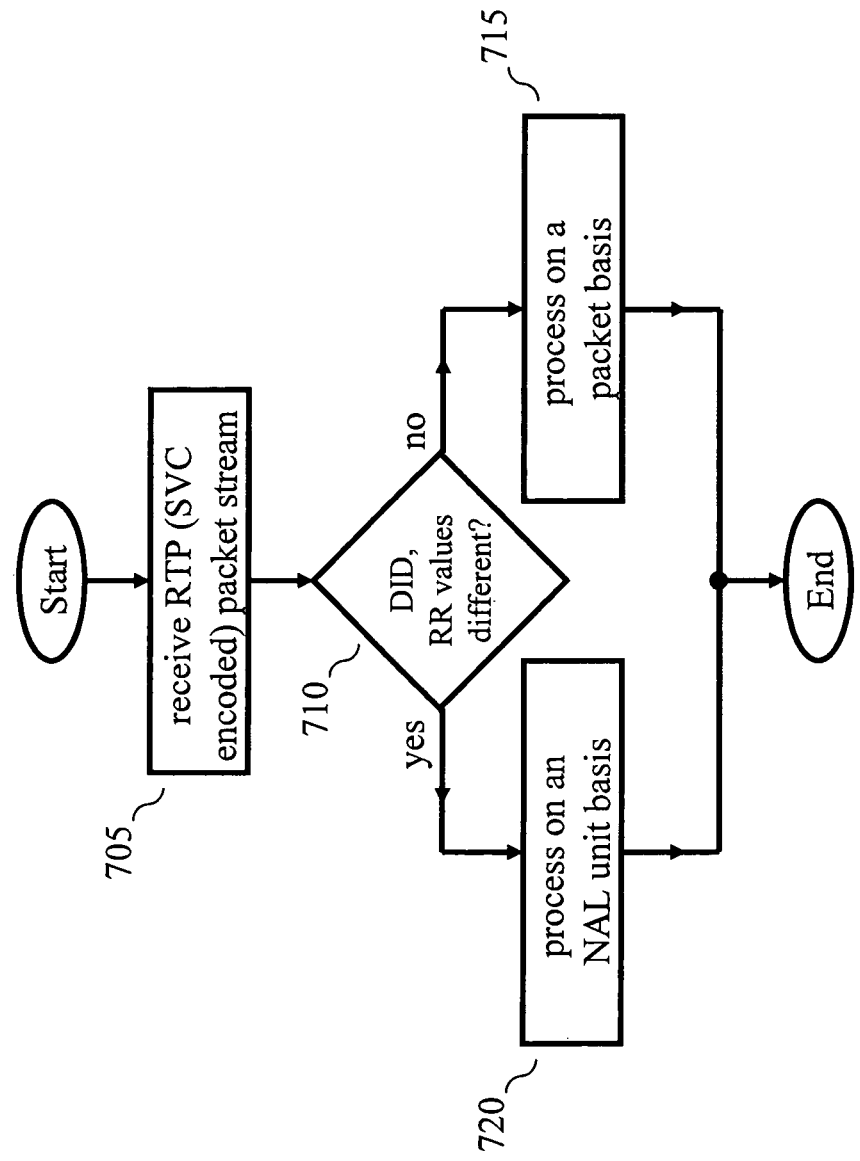

Turning now to FIG. 12, an illustrative flow chart for use in a receiver, e.g., MANE 700 of FIG. 11, is shown. In step 705, MANE 700 receives an RTP (SVC encoded) packet stream. In step 710, MANE 700 compares the values in the respective DID and RR fields in the PACSI NAL Unit of each received STAP packet. If the respective DID and RR values are the same, then MANE 700 processes the received STAP packet on a packet basis. For example, if there is network congestion, dropping the entire packet. On the other hand, if the respective DID and RR values are different, then MANE 700 processes the received STAP packet on an NAL Unit basis. For example, if there is network congestion, enhancement layers may be dropped. Thus, an in accordance with the principles of the invention, MANE 700 determines scalability information by comparing the values in the DID and RR fields rather then by looking into the following aggregated NAL units themselves. Consequently, MANE 700 can more efficiently process the received RTP (SVC encoded) stream 699 and forward, process or discard the encapsulated NAL units in forming RTP (SVC encoded) stream 701.

In other words, when an SVC stream includes both low resolution and high resolution scalable layers, the individual NAL units for channel change and regular stream will use different DID value in their NAL headers. When these NAL units are aggregated into a single RTP packet the DID and RR fields in the PACSI NAL unit will be set appropriately in accordance with the principles of the invention. However, looking at the DID value itself, a MANE can not tell whether the following NAL units are from one scalable layer or not. As such, if a MANE needs to only forward a lower resolution scalable layers to cell phone users, the MANE must parse each remaining NAL units before forwarding. However, by using the RR field of the PACSI NAL unit in accordance with the principles of the invention, the MANE can quickly know if all the remaining NAL units of the received STAP packet belongs to the same scalable layer without the need to parse each remaining NAL unit and, e.g., forward the STAP packet if it belongs to lower resolution scalable layers or discard the STAP packet if it does not.

As described above, and in accordance with the principles of the invention, a bit stream encoding pattern reduces the overall bit rate when MPEG Scalable Video Coding (SVC) (e.g., see, ITU-T Recommendation H.264 Amendment 3: "Advanced video coding for generic audiovisual services: Scalable Video Coding") is used for fast channel change. As a result, the overall bit rate of the SVC compressed video streams can be reduced without impact on fast channel change performance. In addition, and in accordance with the principles of the invention, a method of RTP packetization using STAP packetization improves the transmission efficiency and improves the overall channel change Quality of Experience (QoE). Finally, and in accordance with the principles of the invention, PACSI header information is modified to ensure flexibility in extracting SVC layers by MANEs (Media-Aware Network Elements). It should be noted that although the inventive concept was described in the context of two-layer spatial scalable SVC bit streams, the inventive concept is not so limited and can be applied to multiple spatial scalable layers as well as temporal and quality PSNR (signal-to-noise ratio) scalability specified in the SVC standard.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the steps shown in, e.g., FIGS. 4 and 8, etc. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for transmitting a video signal comprising:
   selecting a first scalable layer of a scalable video coded signal as a channel change layer; the first scalable layer having an associated dependency_id value that is less than an associated dependency_id value of a second scalable layer of the scalable video coded signal; and
   transmitting the scalable video coded signal in packet form using a Real-time Transport Protocol such that non-random access point slices are conveyed in Simple Time Aggregation Packets, each Simple Time Aggregation Packet comprising a Payload Content Scalability Information Network Abstraction Layer Unit,
   wherein the transmitting step includes:
      setting a DID field of the Payload Content Scalability Information Network Abstraction Layer Unit to a lowest value of the dependency_id value of the remaining Network Abstraction Layer Units in the respective Simple Time Aggregation Packet; and
      setting an RR field of the Payload Content Scalability Information Network Abstraction Layer Unit to a highest value of the dependency_id value of the remaining Network Abstraction Layer Units in the respective Simple Time Aggregation Packet.

2. The method of claim 1, comprising encoding the video signal such that random access points in the first scalable layer and random access point in the second scalable layer occur in different access units as a function of coding efficiency.

3. The method of claim 1, comprising encoding the video signal, wherein more random access points are provided in the first scalable layer than the second scalable layer.

4. The method of claim 1, wherein the first scalable layer is a base layer of the video coded signal.

5. The method of claim 1, wherein the video coded signal comprises more than two scalable layers.

6. The method of claim 1, wherein a random access point is an Instantaneous Decoder Refresh slice.

7. A method for use in a receiver, the method comprising:
   receiving a Real-time Transport Protocol scalable video coded packet stream comprising Simple Time Aggregation Packets, each having a Payload Content Scalability Information Network Abstraction Layer Unit;
   comparing values conveyed in a DID field and an RR field of a received Payload Content Scalability Information Network Abstraction Layer Unit;
   if the values of the DID field and the RR field are the same, processing the respective STAP packet on a packet basis; and
   if the values of the DID field and the RR field are different, processing the respective NAL units of the respective STAP packet.

8. The method of claim 7, wherein the receiver is a Media Aware Network Element.

9. Apparatus comprising:
   a scalable video encoder for providing a video coded signal comprising a first scalable layer and a second scalable layer, wherein the first scalable layer has an associated dependency_id value that is less than an associated dependency_id value of the second scalable layer and wherein for at least a portion of the video coded signal random access points in the first scalable layer and random access point in the second scalable layer occur in different access units; and
   a modulator for transmitting the video coded signal;
   wherein the transmitted video coded signal is conveyed in packet form using a Real-time Transport Protocol such that non-random access point slices are conveyed in Simple Time Aggregation Packets, each Simple Time Aggregation Packet comprising a Payload Content Scalability Information Network Abstraction Layer Unit, and
   wherein a DID field of the Payload Content Scalability Information Network Abstraction Layer Unit is set to a lowest value of the dependency_id value of the remaining Network Abstraction Layer Units in the respective Simple Time Aggregaticm Packet; and an RR field of the Payload Content Scalability Information Network Abstraction Layer Unit is set to a highest value of the dependency_id value of the remaining Network Abstraction Layer Units in the respective Simple Time Aggregation Packet.

10. The apparatus of claim 9, wherein the scalable video encoder encodes the video signal such that random access points in the first scalable layer and random access point in the second scalable layer occur in different access units as a function of coding efficiency.

11. The apparatus of claim 9, wherein the scalable video encoder provides more random access points in the first scalable layer than the second scalable layer.

12. The apparatus of claim 9, wherein the first scalable layer is a base layer of the video coded signal.

13. The apparatus of claim 9, wherein the video coded signal comprises more than two scalable layers.

14. The apparatus of claim 9, wherein a random access point is an Instantaneous Decoder Refresh slice.

* * * * *